(No Model.) 2 Sheets—Sheet 1.
J. H. PEARCE.
APPARATUS FOR COATING FABRICS WITH RUBBER.
No. 376,344. Patented Jan. 10, 1888.
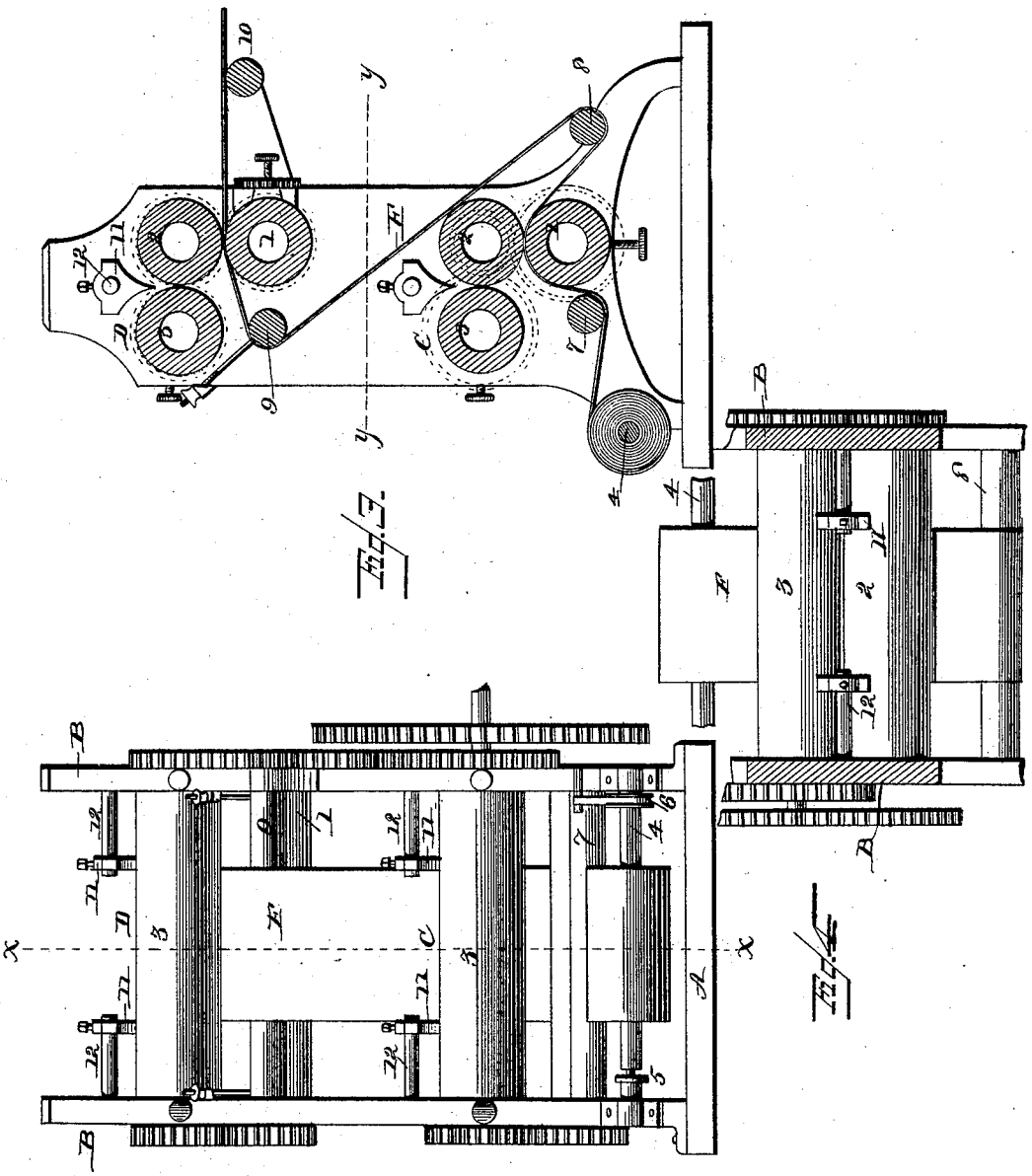
Witnesses
Franck L. Ouraud
Edwin L. Clarkson
Inventor
John H. Pearce
By his Attorney F. W. Ritter Jr

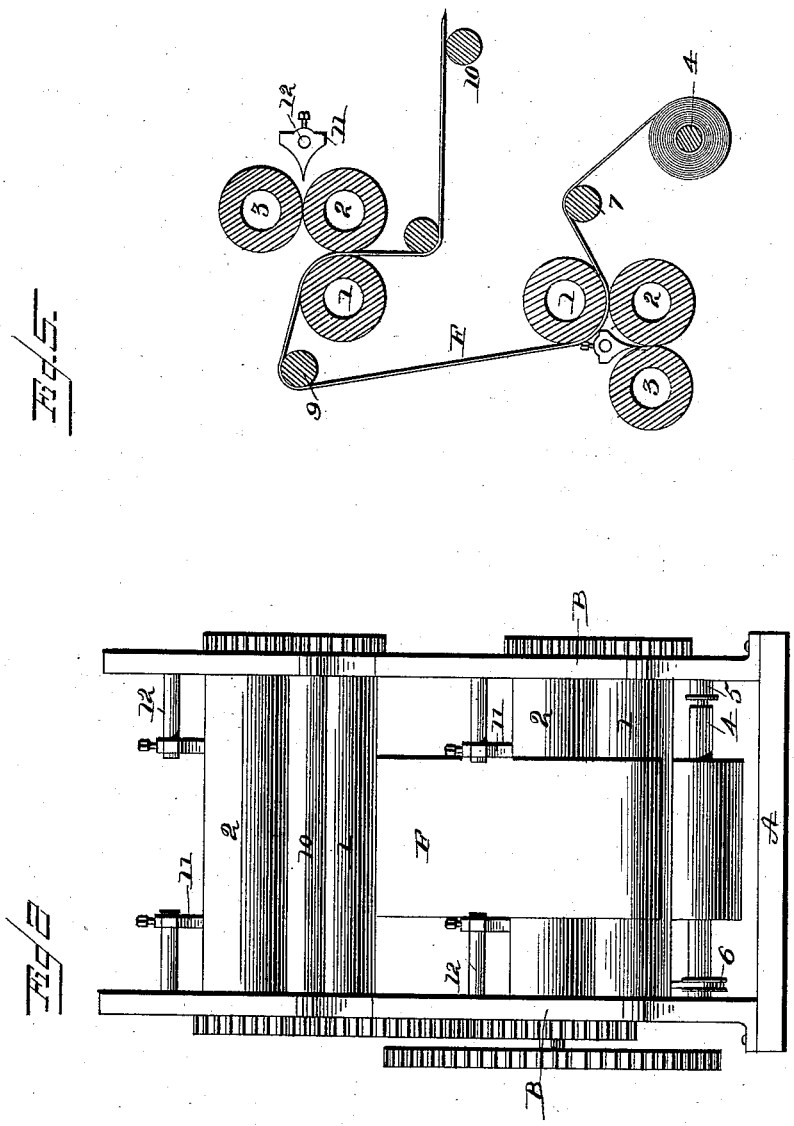

UNITED STATES PATENT OFFICE.

JOHN H. PEARCE, OF NEW HAVEN, CONNECTICUT.

APPARATUS FOR COATING FABRICS WITH RUBBER.

SPECIFICATION forming part of Letters Patent No. 376,344, dated January 10, 1888.

Application filed July 8, 1887. Serial No. 243,719. (No model.)

*To all whom it may concern:*

Be it known that I, JOHN H. PEARCE, a citizen of the United States, residing at New Haven, in the county of New Haven, State of Connecticut, have invented certain new and useful Improvements in Apparatus for Coating Fabrics with Rubber; and I hereby declare the following to be a full, clear, and exact description of the same, reference being had to the accompanying drawings, wherein—

Figure 1 is an elevation of one end of a machine embodying my invention. Fig. 2 is an elevation of the reverse end. Fig. 3 is a vertical central section on the line $x\ x$, Fig. 1, showing the relation of the rolls. Fig. 4 is a horizontal section on the line $y\ y$, showing the relation of the guides to the rubber-sheet rolls. Fig. 5 is a diagram similar to the vertical section, Fig. 3, showing a modification in the arrangement of the rolls, which is somewhat simpler though not so desirable as the preferred form shown in the main figures.

Like letters refer to like parts wherever they occur.

My present invention relates to the construction of apparatus for applying two coats of rubber or like material to one and the same side of a fabric, and has for its object to economize time, space, and labor, and to obtain a rubber fabric of greater elasticity than is obtainable by the means or apparatus now commonly employed.

To this end the invention consists, mainly, in the combination of two sets of feed and forming rolls relatively arranged to apply two coats to the same side of the fabric in quick succession, and while the tension of the fabric remains the same; and, secondly, in details of construction, adjuncts to the main combinations, for better supporting and controlling the fabric to which the rubber is to be applied, and the rubber which is to be applied to the fabric, substantially as will hereinafter more fully appear.

I will now proceed to describe more specifically the apparatus shown in the drawings, so as to enable others skilled in the art to apply the invention.

In the drawings, A indicates a base, and B the housings or frame, forming a suitable support of any desired character for the operative parts, to be hereinafter described. Within such suitable frame are journaled two sets of rolls, C and D, each set composed of at least three rolls—namely, a fabric-roll, 1, which supports the fabric while the rubber is being applied thereto, a presser-roll, 2, which applies the rubber to the material, and a feed-roll, 3, which feeds the rubber to the presser-roll 2. The rolls 2 and 3 of each set (C and D) are made adjustable, in order to increase or diminish the thickness of the sheet of rubber and to increase and decrease the pressure exerted in applying the rubber coating to the fabric. It is evident that the number of rolls in each set may be multiplied and their functions or duties divided up; but I prefer the arrangement shown in the drawings—that is to say, the rolls 2 and 3 arranged in the same plane and coacting to form the sheet as well as feed the rubber to the fabric.

4 indicates the spindle or shaft for the roll of fabric to be coated, which spindle is provided at one end with a clamp or clutch, 5, which renders it detachable from the machine for purposes of inserting a roll of fabric, and at the other end with an adjustable friction-brake, 6, (which may be a pulley and band, as shown,) to prevent any slack and to control the tension of the fabric in its passage through the machine.

7, 8, 9, and 10 indicate small guide-rollers for controlling the position of the fabric and its relation to the rolls. The guide-roller 9 is made adjustable by means of a set screw or in any other suitable manner, so as to take up any slack which may occur in the fabric F between the two rolls, and thus preserve uniform tension throughout the fabric.

The importance of an adjustable guide-roller 9, or its equivalent, interposed between the two sets of (presser, feed, and fabric) rolls which apply the different coats of rubber to the fabric is very great, as without such a device the tendency to change of tension in the fabric after receiving its first coating would render it almost impossible to apply the second coating immediately upon the first and still produce a merchantable article.

The preferred arrangement of the fabric-roll 1, presser-roll 2, and guide-rollers 7 and 8 is that shown in Fig. 3—that is to say, the presser-roll 2 directly over the fabric-support roll 1 and the guide-rollers 7 and 8 below the plane of the axis of the roll 1—as thereby the fabric can be readily inserted without disturbing the rolls, while in the modification shown in Fig. 5 the fabric-roll 1 has usually to be made adjustable, so as to be raised when passing the end of the fabric between the rolls.

11 indicates guides for controlling the feed of the rubber and regulating the width of the sheet formed to correspond with the width of the fabric to be coated. Said guides are adjustable on short rods 12, which may project from the frame B, and are secured by set-screws. The form of the guides 11 should correspond to the curve of the rolls 2 and 3 and their location to the plane which passes between the rolls.

Power from any suitable source is applied to the shaft of the fixed roll, and is thence communicated, through appropriate pinions and idlers, to the several rolls of the series.

If it is desired to apply the coat as a friction-coat—in manner well known to those skilled in the art—then the pinion of presser-roll 2 of that set should be of a character to give said roll greater surface speed; or, what is equivalent thereto, the roll itself may be of such a diameter with relation to the other rolls as to obtain greater surface speed and a rubbing action. Where no friction coat is to be applied, the speed of the several rolls will be uniform; and in any case only that roll will be speeded which is applying the friction-coat.

F indicates the fabric, which, before starting the machine, has its free end passed first over or under the guide-rolls 7 and 8, as the case may be, thence over the fabric-roll 1, or between it and roll 2 of the first set, thence over guide-roller 9, between rolls 1 and 2 of the second set, and finally over guide-roller 10, whence it may pass to a second or receiving spindle similar to spindle 4, if desired.

The rubber in its raw state as it comes from the masticator, having its desired proportion of whiting, sulphur, or equivalent ingredients, and in the form of a ball or mass, is fed into the rolls 2 and 3 between the guides 11, and is formed thereby into a plastic sheet, which is carried by the presser-roll 2 down upon the fabric F, passing between the rolls 1 and 2. If the gearing is of the proper character, the lower or first set will apply a friction-coat to the fabric, and the fabric, passing thence immediately to the second set, will receive a calender-coat, which latter may be made pebbled or otherwise ornamented by providing a suitable surface on presser-roll 2 of set D, (or the second set.)

The advantages of apparatus embodying my invention are the great saving of apparatus and space, greatly-reduced time required for double-coating fabrics of any given length, uniformity in the character, and greater elasticity in the fabric, due to the fact that the coats may be successively and continuously applied, while a given and uniform tension of the fabric is maintained.

Having thus described my invention, what I claim, and desire to secure by Letters Patent, is—

1. In a machine for applying two coats of rubber to one and the same side of a fabric, the combination of two sets of rolls, each set composed of a fabric-roll, a presser-roll, and a feed-roll, said sets relatively arranged to apply two coats to the same side of the fabric in succession, and so that the fabric passes immediately from one set to the other, substantially as and for the purposes specified.

2. In a machine for applying rubber to fabrics, the combination of a feed-roll and a presser-roll arranged in the same horizontal plane, a fabric-roll arranged below and in the same vertical plane as the presser-roll, and two guide-rollers arranged below the axis of the fabric-roll, substantially as and for the purpose specified.

3. In a machine for applying two coats of rubber to one and the same side of a fabric, the combination, with two sets of rolls, each set composed of a fabric-roll, a presser-roll, and a feed-roll, of an adjustable guide-roller interposed between the two sets, substantially as and for the purposes specified.

In testimony whereof I affix my signature in presence of two witnesses.

JOHN H. PEARCE.

Witnesses:
THOMAS R. ACKRILL, Jr.,
SIMON J. HURLEY.